United States Patent
Miyakoshi

(10) Patent No.: US 7,746,327 B2
(45) Date of Patent: Jun. 29, 2010

(54) REMOTE-CONTROL SWITCH

(75) Inventor: Tetsuya Miyakoshi, Niiza (JP)

(73) Assignee: Honda Access Corporation, Niiza-shi (JP)

( * ) Notice: Subject to any disclaimer, the term of this patent is extended or adjusted under 35 U.S.C. 154(b) by 958 days.

(21) Appl. No.: 11/227,072

(22) Filed: Sep. 16, 2005

(65) Prior Publication Data

US 2006/0097994 A1    May 11, 2006

(30) Foreign Application Priority Data

Nov. 8, 2004   (JP) .............................. 2004-324254

(51) Int. Cl.
   *G06F 3/041*   (2006.01)
(52) U.S. Cl. ..................... 345/173; 345/156; 345/158; 345/168; 345/169; 341/20; 341/21; 341/22; 348/734; 463/37; 463/38; 715/808; 715/835; 715/863
(58) Field of Classification Search ................. 345/173, 345/158, 168, 2, 156, 169; 341/20, 21, 22; 348/734; 463/37, 38; 715/808, 863, 835
   See application file for complete search history.

(56) References Cited

U.S. PATENT DOCUMENTS

| | | | |
|---|---|---|---|
| 4,333,097 A | | 6/1982 | Buric et al. |
| 5,119,079 A | * | 6/1992 | Hube et al. .................. 715/823 |
| 5,523,774 A | | 6/1996 | Schwartz |
| 5,539,427 A | * | 7/1996 | Bricklin et al. ............. 345/622 |
| 5,615,384 A | * | 3/1997 | Allard et al. ................ 715/800 |
| 6,073,036 A | * | 6/2000 | Heikkinen et al. ........ 455/550.1 |
| 6,211,856 B1 | * | 4/2001 | Choi et al. .................. 345/666 |
| 6,271,835 B1 | * | 8/2001 | Hoeksma .................... 345/168 |
| 6,462,733 B1 | * | 10/2002 | Murakami .................. 345/173 |
| 6,765,557 B1 | * | 7/2004 | Segal et al. ................. 345/173 |
| 6,903,723 B1 | * | 6/2005 | Forest ......................... 345/157 |
| 7,075,512 B1 | * | 7/2006 | Fabre et al. ................. 345/156 |
| 7,154,483 B2 | * | 12/2006 | Kobayashi .................. 345/173 |

(Continued)

FOREIGN PATENT DOCUMENTS

EP          1067784 A2    1/2001

(Continued)

OTHER PUBLICATIONS

Japanese Office Action dated Feb. 12, 2008 (mailing date), issued in corresponding Japanese Patent Application No. 2004-324254.

(Continued)

*Primary Examiner*—Lun-Yi Lao
*Assistant Examiner*—Gregory J Tryder
(74) *Attorney, Agent, or Firm*—Westerman, Hattori, Daniels & Adrian, LLP

(57) ABSTRACT

A remote-control switch in which finger dirt can be infallibly prevented from adhering to a display unit. A remote touch pad 4 capable of performing selection operation is provided separately from a navigation body 2 and the navigation body 2 can be remote-controlled by practicing a touch input through an input panel 11. Hence, the same operating feeling as if touching a touch panel 5 can be given a user via the input panel 11, thus allowing the finger dirt to be infallibly prevented from adhering to a monitor 6 and further enabling operation excellent in usability.

11 Claims, 6 Drawing Sheets

U.S. PATENT DOCUMENTS

| | | | |
|---|---|---|---|
| 7,221,358 B2 * | 5/2007 | Sasaki | 345/173 |
| 7,336,263 B2 * | 2/2008 | Valikangas | 345/173 |
| 2004/0085352 A1 * | 5/2004 | Nagasaka et al. | 345/744 |
| 2009/0295745 A1 * | 12/2009 | Qian | 345/173 |

FOREIGN PATENT DOCUMENTS

| | | |
|---|---|---|
| JP | 61-120948 U | 7/1986 |
| JP | 9-33275 | 2/1997 |
| JP | 10-27053 | 1/1998 |
| JP | 11-024834 A | 1/1999 |
| JP | 2001-175375 A | 6/2001 |
| JP | 2002-091677 A | 3/2002 |
| WO | 02/086692 A1 | 10/2002 |

OTHER PUBLICATIONS

Search Report, UKPO dated Dec. 5, 2005.
Japanese Office Action dated May 12, 2008, issued in corresponding Japanese Patent Application No. JP2004-324254.
Office Action issued Sep. 30, 2009 in corresponding United Kingdom Patent Application GB0522032.2.

* cited by examiner

REMOTE-CONTROL SWITCH

BACKGROUND OF INVENTION

1. Field of the Invention

The present invention relates to a remote-control switch, which is suitable for use in a navigation system mounted inside a vehicle, for example.

2. Related Prior Art

In a conventional navigation system, a touch-sensitive panel (simply called "touch panel" hereinafter) is provided in a LCD (liquid crystal display) monitor. A plurality of setting switches, which are displayed as images on the monitor, are arranged on the monitor, corresponding to various functions. Thus, when a user's finger presses a desired setting switch on the touch panel, a process corresponding to the setting switch is practiced to display on the monitor a prescribed processing result such as the zooming of the display of map images, as disclosed in e.g., Japanese un-examined patent publication No. 9-33275.

With respect to a navigation system employing the touch panel thus configured, however, there has been a problem that every time a setting switch is selected and a function thus selected is realized, a finger must touch the monitor. Hence, dirt such as a fingerprint or the like adheres to a surface of the monitor, so that the monitor is not seen clearly, leading to unavailability due to the adherent dirt or the like.

The present invention has been made in view of the above-mentioned problems, and thus it is an object of the present invention to provide a remote-control switch which enables a display unit thereof to be reliably prevented from being stained with the dirt on a finger. It is another object of the invention to provide a remote-control switch which is easy to operate.

SUMMARY OF THE INVENTION

In order to attain the above objects, a first aspect of the present invention proposes a remote-control switch, used for a remote-control electronic apparatus, including: a display unit for displaying images; a control means for controlling image display of the display unit; and an input panel in which a plurality of switches are arranged on a plane surface. The input panel is made up separately from the display unit. A screen coordinate of the display unit and each switch coordinate of the input panel are allowed to substantially correspond to each other, and the switch image corresponding to each switch of the input panel is displayed on the display unit by the control means.

According to the first aspect of the present invention, without directly touching a display screen of a display unit with a finger, operational feeling of touching a touch panel can be given via an input panel, thus enabling dirt of the finger to be prevented from adhering to the display screen, so that an excellent easy-to-use remote-control switch can be realized.

A second aspect of the present invention is a remote control switch in which the input panel comprises the switches arranged in two layers, i.e., upper and lower layers, wherein the upper layer includes a select function of the switch images while the lower layer includes a determination function for determining the select function.

According to the second aspect of the present invention, not only a switch image can be selected but the switch image thus selected can be easily determined to implement a prescribed process corresponding to the switch image. Thus, maneuverability can be further improved.

A third aspect of the present invention is a remote control switch in which when a plurality of switch images on a display screen in the display unit have been selected, the plurality of the switch images selected are highlighted.

Thus, according to the third aspect of the present invention, even when switch images are closely-spaced on a display screen and a plurality of the switch images have been selected simultaneously, the plurality of the switch images thus selected are highlighted, so that a user can easily select only a desired switch image via an input panel.

BRIEF DESCRIPTION OF THE DRAWINGS

The invention will be more readily understood by reference to the following description, taken with the accompanying drawings, in which.

DETAILED DESCRIPTION OF THE INVENTION

Next is a detailed description of one preferred embodiment with reference to the appended drawings.

Figure 1:
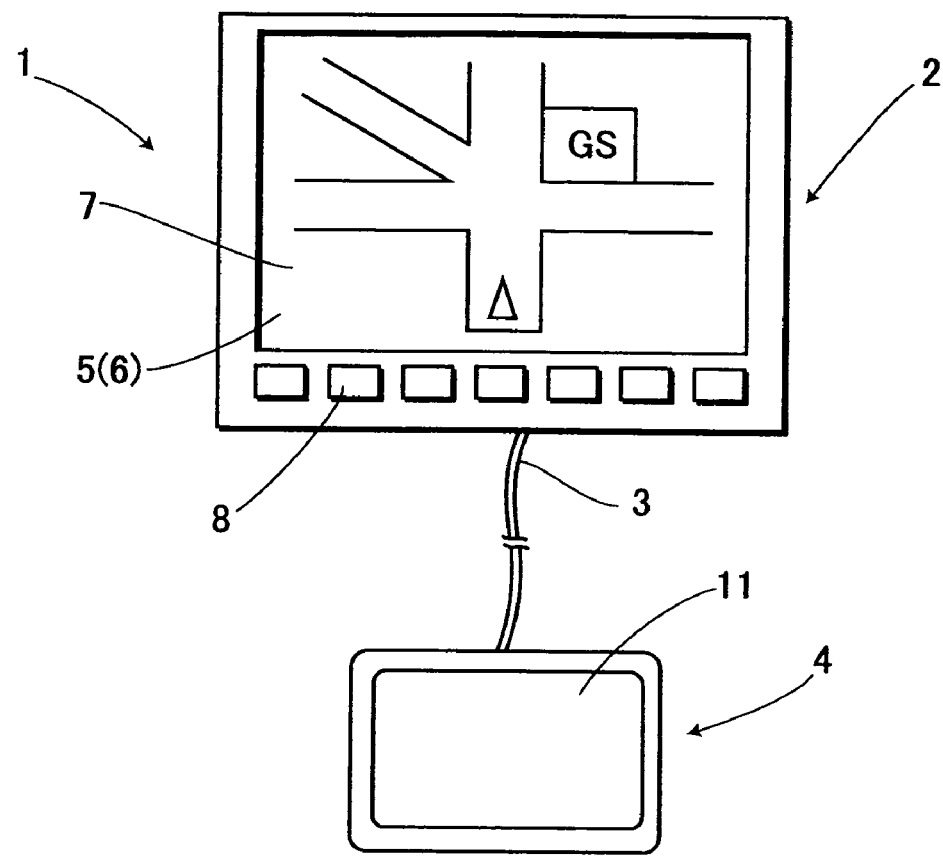
FIG. 1 is a front view showing an overall configuration of a navigation system of the present invention.

In FIG. 1, numeral symbol 1 designates an overall in-vehicle navigation system that is a remote-control electronics apparatus. The navigation system 1 comprises a navigation body 2 and a remote touch pad 4 connected electrically with the navigation body 2 through a cable 3.

In the navigation system 1, the navigation body 2 is mounted on a car-interior front console (not shown), including a display unit 7 composed of a monitor 6 with a touch-sensitive panel 5 (hereinafter simply called touch panel) attached to a front side of a chassis of the navigation body 2 and an operating unit 8 arranged with various types of manual operation buttons including a power button or the like around the display unit 7.

The navigation body 2 practices a prescribed processing by pushing down the manual operation buttons of the operating portion 8. As a result, processing results are displayed on a horizontally long and nearly oblong monitor 6.

Figure 2:
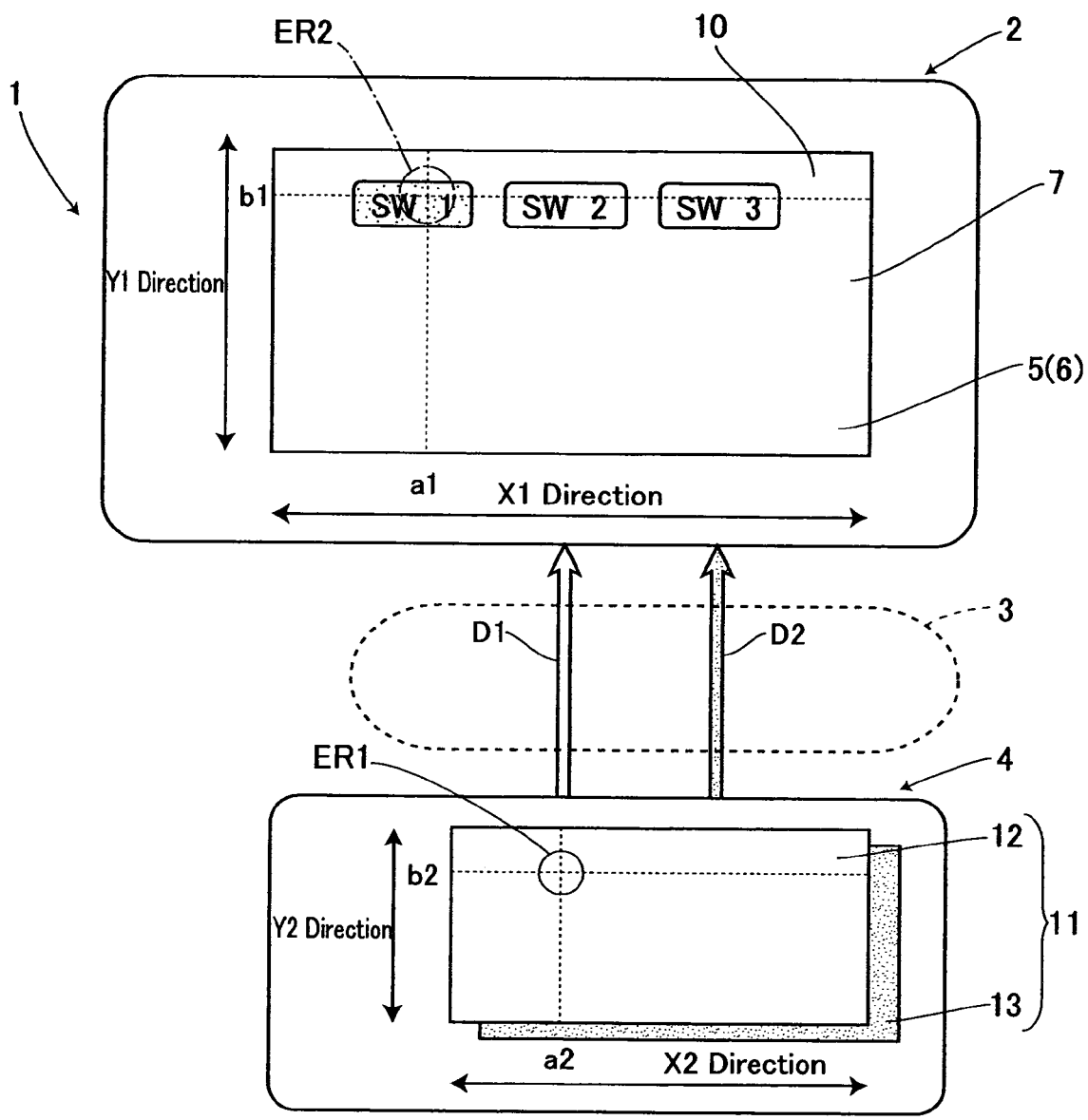
FIG. 2 is a schematic diagram showing the configuration of the navigation system of the present invention.

Furthermore, as shown in FIG. 2, the navigation body 2 can display a plurality (three, in this case) of setting switches SW1, SW2 and SW3 on the monitor 6, with these setting switches overlapped on a map image.

In the monitor 6, an X1 coordinate and a Y1 coordinate are related to each other so that a lateral direction (X1 direction) and a longitudinal direction (Y1 direction) can be indicated by a two-dimensional plane coordinate. Then, each of the setting switches SW1, SW2 and SW3 to which predetermined two-dimensional coordinate information is accorded in advance is disposed and displayed at a predetermined position on a display screen 10 on the basis of the two-dimensional coordinate information.

Consequently, by pushing down, through the touch panel, the setting switch SW1 selected by a user from among the setting switches SW1, SW2 and SW3 that give a variety of operational instructions, the two-dimensional coordinate data consisting of X1 coordinate and Y1 coordinate are detected through the touch panel. Then, the setting switch SW1 pushed down is recognized on the basis of the two-dimensional coordinate, thereby allowing implementation of a prescribed process corresponding to the setting switch SW1.

In addition to the foregoing, the navigation system 1 employs such structure that the remote touch pad 4, for example, is arranged on a center console between a driver seat and a front passenger seat (not shown), and either of the driver and the passenger that are seated on front seats can perform touch inputs of various kinds to the remote touch pad 4, using a fingertip of one hand.

That is, the remote touch pad 4 functioning as a remote-control apparatus allows the navigation body 2 to carry out processes based on the operation instructions given by the various touch inputs, thus permitting the processing results selected by the user to be displayed on the monitor 6.

The remote touch pad 4 is provided with a downsized input panel 11 that has nearly the same aspect ratio as that of the monitor 6 of the navigation body 2 and is made smaller than the monitor 6.

This input panel 11 comprises two layers, i.e., upper and lower layers. The upper layer is arranged with an XY coordinate detection operating unit 12 with a select function, while the lower layer is arranged with a Z coordinate detection operating unit 13 with a determination function.

The XY coordinate detection operating unit 12 has the same configuration as that of the existing touch panel, including a plurality of switches (not shown) for detecting the contact of the users' finger with the input panel 11.

The plurality of switches (not shown) of the XY coordinate detection operating unit 12 are each allowed to correspond to a two-dimensional coordinate as a respective switch coordinate by means of X2 coordinate for indicating a lateral direction (X2 direction) of the input panel 11 and Y2 coordinate for indicating a longitudinal direction (Y2 direction) thereof.

Figure 3:
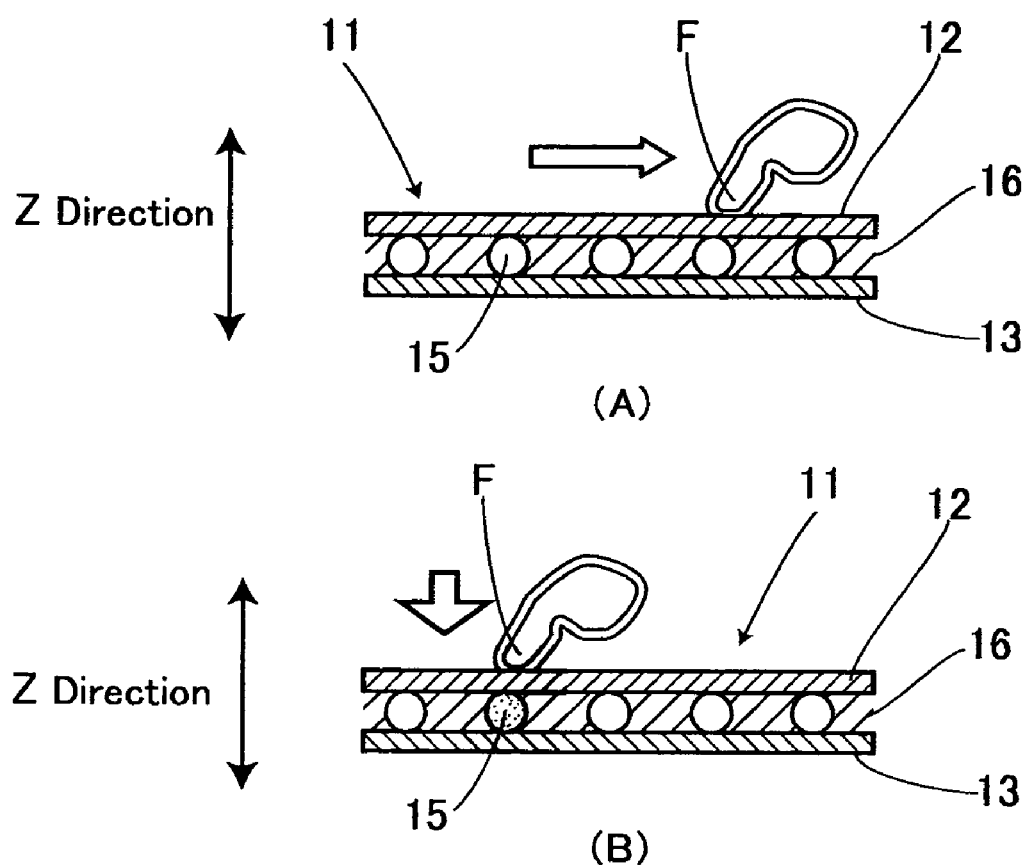
FIGS. 3(A) and 3(B) are cross-sectional views showing a configuration of an input panel thereof.

Then, when a finger F contacts with and slides on a surface of the input panel 11 to perform the selective operation, as shown in FIG. 3(A), the XY coordinate detection operating unit 12 can detect, by the switch coordinate (two-dimensional plane coordinate), a specific position on the input panel 11 on which the selective operation has been performed Thus, by using the two-dimensional plane coordinate comprising the X2 coordinate and the Y2 coordinate, the XY coordinate detection operating unit 12 is able to indicate the position on the input panel 11 the user's finger has contacted.

Here, the two-dimensional plane coordinate comprising the X2 coordinate indicating the X2 direction and the Y2 coordinate indicating the Y2 direction on the input panel 11, as shown in FIG. 2 are allowed to correspond to a screen coordinate indicated by the two-dimensional coordinate consisting of the X1 coordinate indicating the X1 direction and the Y1 coordinate indicating the Y1 direction on the monitor 6, respectively. Therefore, the switch coordinate detected on the input panel 11 can be displayed on the monitor 6.

The Z coordinate detection operating unit 13 is, as shown in FIGS. 3(A), 3(B), arranged on the underside of the XY coordinate detection operating unit 12 via a transparent film layer 16 in which powders 15 are mixed. When pressing strength larger than a predetermined one is applied to the Z coordinate detection operating unit 13 in the Z direction from the upper side through the XY coordinate detection operating unit 12, the pressing strength can be detected via the film layer 16.

Incidentally, in the Z coordinate detection operating unit 13, the pressing strength applied to the input panel 11 in the Z direction by the user's finger F is transmitted mainly via the powders 15, so that the pressing strength is applied intensively to the powders 15 without being dispersed over the film layer 16, so that the pressing strength can be correctly detected.

Thus, the Z coordinate detection operating unit 13 can detect only the pressing strength lager than the predetermined one for the input panel 11.

Figure 4:
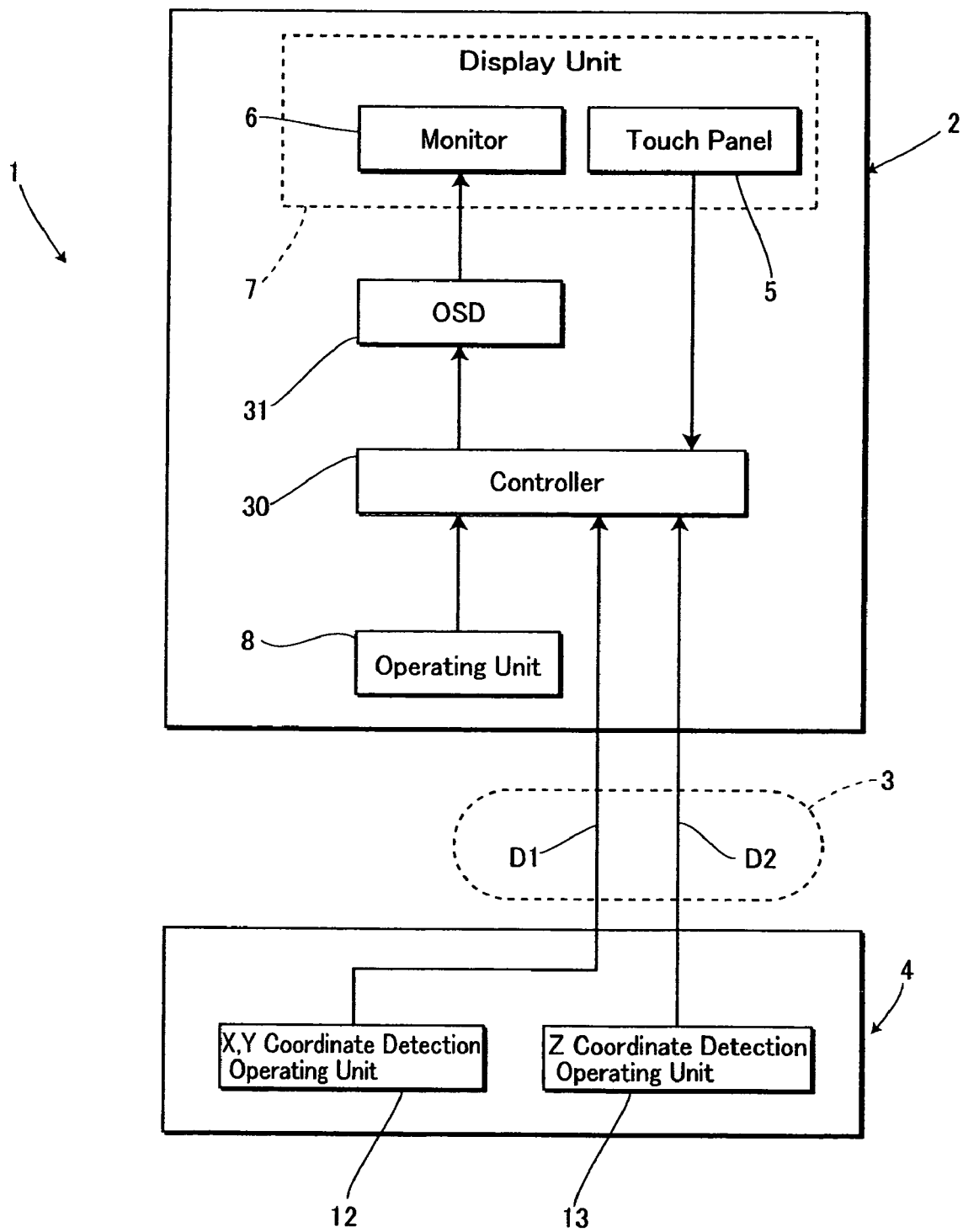
FIG. 4 is a block diagram showing architecture of the navigation system according to the present invention.

In the navigation system body 2 like this, as shown in FIG. 4, the operating unit 8, an OSD unit 31, and the touch panel 5 of the display unit 7 are connected to a controller 30 for controlling overall various types of functions of the navigation system 1, while the XY coordinate detection operating unit 12 and Z coordinate detection operating unit 13 of the remote touch pad 4 are connected to the controller 30 through cables 3. Further, the monitor 6 of the display unit 7 is coupled to the OSD unit 31.

Incidentally, a GPS (Global Positioning System) receiver (not shown) is connected to the controller 30. Position data indicating latitudes and longitudes on the basis of satellite signals received from the GPS satellite by the GPS receiver are extracted. Thus, the present position of one's own automobile mounted with the navigation system can be displayed on the monitor 6 together with the map image.

In this case, the controller 30 comprises a CPU (Central Processing Unit) (not shown), a RAM (Random Access Memory), a ROM (Read Only Memory) or the like where a wide variety of programs including a base program, a remote touch pad operation processing program or the like have been beforehand stored. In response to various types of operation instructions, the controller 30 reads out accordingly the wide variety of the programs stored in the ROM in the RAM to thereby perform the prescribed processes.

The controller 30, for example, controls each circuit such as the OSD unit 31 in response to the operation instructions input via the touch panel 5 and the operating unit 8 that are provided on the monitor 6, thus performing various kinds of processes including a change in a scale size of a map and a route search or the like to display the processing results on the monitor 6.

Then, based on control signals fed from the controller 30, the OSD unit 31 delivers, to the monitor 6, character image signals for indicating the setting switch images SW1, SW2 and SW3 that are utilized at the time of setting various operations (the change in the scale size of the map and the route search).

The monitor 6, based on the control signals fed from the OSD unit 31, behaves so as to overlap the character image signals for displaying the setting switches SW1, SW2 and SW3 and image signals (e.g., image signals or the like for displaying the map image on the monitor 6) from the controller 30 and thus display the setting switches SW1, SW2 and SW3 (i.e., switch images) with the setting switches overlapped on the map image (see FIG. 2).

In addition, these setting switches SW1, SW2 and SW3 that are displayed as the switch images are displayed on the monitor 6 in displaying forms (hereinafter referred to as a standard form) such as a predetermined color (hereinafter referred to as a standard color) and characters that have been set in advance.

Consequently, when a desired setting switch SW1, SW2, or SW3 is pressed to be selected and determined to operate, the controller 30 practices a prescribed process relevant to the setting switch that has been pressed and then displays, on the monitor 6, the processing results such as a zooming process of the map image or the like.

In addition to this, the controller 30 develops a remote touch pad operation process program read out of the ROM. Then, when the touch input is performed by either the selective operation (FIG. 3(A)) in which the user's finger contacts with and slide on the input panel 11 or pressing operation (FIG. 3(B)) for applying the pressing strength lager than a predetermined one to the touch panel 11 by the user's finger, a display processing on the monitor 6 is performed according to the selective operation and the pressing operation according to the remote touch pad operation processing program.

In other words, as shown in FIG. 3(A), when the selective operation has been performed for the input panel 11, the XY coordinate detection operating unit 12, as shown in FIG. 2, detects the central position of a contact region ER1 in contact with the user's finger F by utilizing the two-dimensional plane coordinate comprising the X2 coordinate and the Y2 coordinate (in this case (X2, Y2)=(a2, b2)), delivering the central position to the controller 30 as the XY coordinate detection data D1 (FIG. 4).

Thus, the controller 30 specifies the corresponding coordinate position (in this case (X1, Y1)=(a1, b1)) (hereinafter this coordinate is referred to as a specified coordinate position) on the monitor 6, thus determining a given selected region ER2 with the specified coordinate position defined as the center. In addition, the selected region ER2 is not displayed on the monitor 6.

Comparing the two-dimensional coordinate for indicating the selected region ER2 and that for indicating an inside of a frame region of the setting switches SW1, SW2 and SW3 with each other, the controller 30 specifies the setting switch SW1, SW2 or SW3 that overlaps the selected region ER2.

Then, when the image of, e.g., the setting switch SW1 among the images of the setting switches SW1, SW2 and SW3 overlaps the selected region ER2, the controller 30 implements a selective display process to change colors of the characters (not shown) and frame within the frame region of the setting switch SW1 from a standard color (e.g., black) into red. Thus, the controller 30 permits the setting switch SW1 to stand out from the other setting switches SW2 and SW3 (these colors are all a standard one, black) that overlap no selected region ER2 and presents, on the monitor 6, the setting switch SW1 as a selected setting switch through the input panel 11.

Thus, the controller 30 changes the display color of the setting switch SW1 selected from the standard color, black, to red to display the red setting switch SW1 on the monitor 6 when the switch SW1 has been selected via the input panel 11. As a result, it becomes possible to make the user recognize immediately through the red color that the setting switch SW1 has been selected via the input panel 11.

In addition, in the embodiment described above, the color of the setting switch SW1 selected is changed from black to red to thereby stand out. The present invention is, however, not limited to the change in color like this. Therefore, with respect to the setting switch SW1, the character sizes may be made larger or a brightness level may be increased and so on. Thus, a standard state display may be changed by various methods to permit the selected switch to stand out.

Thus, every time receiving the XY coordinate detection data D1 from the XY coordinate detection operating unit 12, the controller 30 specifies, on the monitor 6, the corresponding selected region ER2 on the basis of the XY coordinate detection data D1. Thus, the color of the setting switch SW1, SW2 or SW3 that overlaps the selected region ER2 can be changed into red.

In addition to the system thus schemed, as shown in FIG. 3(B), when the input panel 11 has been pressed at the central position of a contact region ER1 (FIG. 2) in contact with the user's finger F, the Z coordinate detection operating unit 13 makes up the Z coordinate detection data D2 to deliver the data D2 to the controller 30 (FIG. 4).

When having received the Z coordinate detection data D2 from the Z coordinate detection operating unit 13, the controller 30 determines the selection of the setting switch SW1 presently selected on the monitor 6 on the basis of the XY coordinate detection data D1 and then carries out the prescribed processing corresponding to the setting switch SW1 such as, e.g., making the transition to a subordinate set image plane corresponding to the setting switch SW1.

For example, when the setting switch SW1 for setting the route search has been selected and determined to operate, as substitute for the map image presently displayed on the monitor 6, the controller 30 displays a route search setting image (not shown) corresponding to the setting switch SW1.

Figure 5:
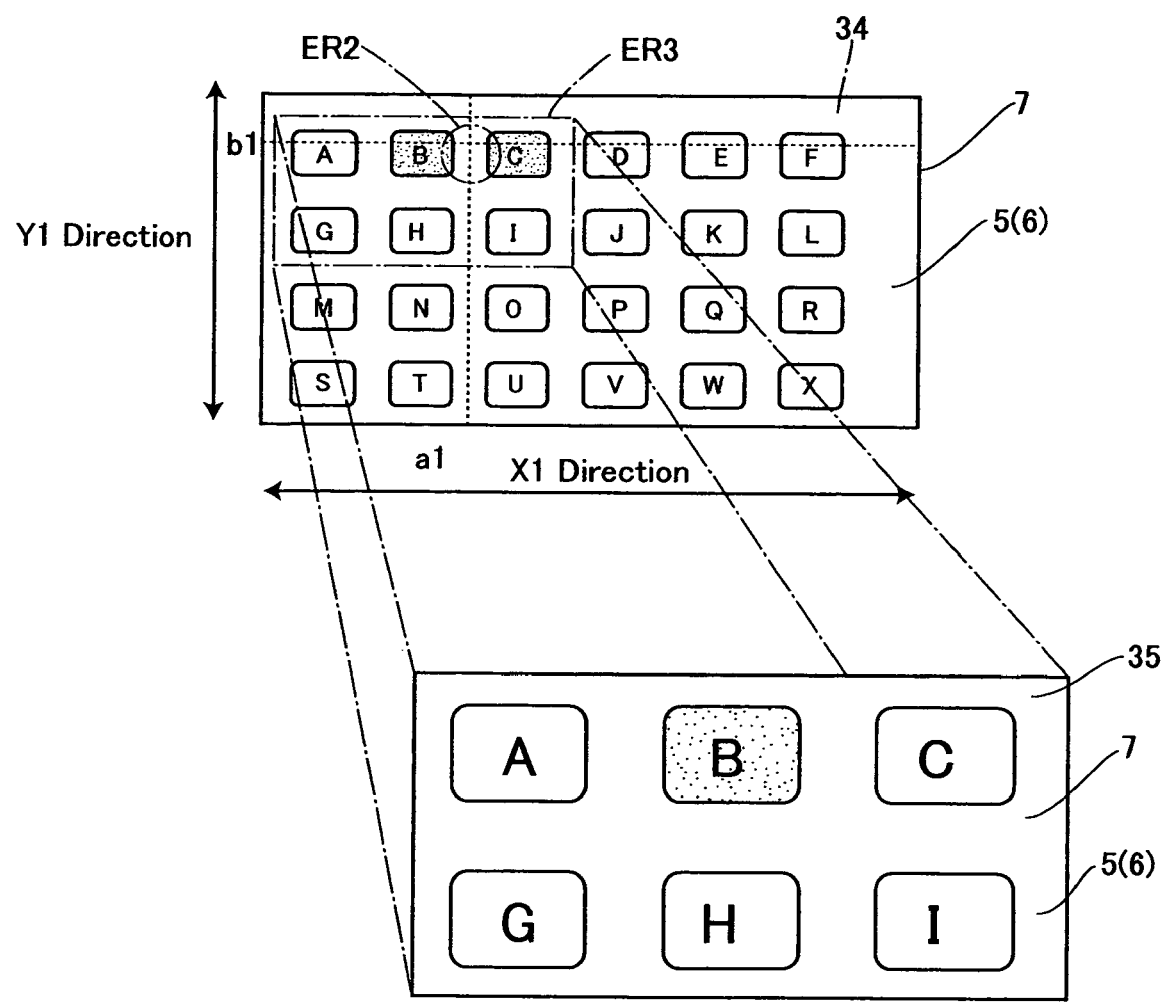
FIG. 5 is a schematic diagram showing a display screen when a zooming process has been performed.

In the meantime, as shown in FIG. 5, when a display screen image 34 is, on the monitor 6, display in which the setting switches displayed as images A to X (in this case, e.g., employed are alphabet switches "A" to "X" used for inputting the alphabetical letters) are closely-spaced, it happens that, e.g., both of two settings switches B, C overlap simultaneously the selected region ER2 specified by the XY coordinate detection data D1.

In this case, the controller 30 performs the selective display processing to change the standard colors, black, of the two setting switches B, C both overlapping the selected region ER2 into red colors to enable two setting switches B, C to be selected.

Thus, the controller 30 changes simultaneously the colors of the two setting switches B, C overlapping the selected region ER2 into red colors to permit the two setting switches B, C stand out from the other switches D to X not overlapping the selected region ER2, so that it is shown on the monitor 6 that the two setting switches B, C have been selected.

Then, in this state of things, when having received the Z coordinate detecting D2 from the Z coordinate detection operating unit 13, the controller 30 performs a zoom processing to change the scale size of a display screen image 34 displayed on the monitor 6, thus displaying, on the monitor 6, a display screen image 35 reformed by zooming the region ER3 of the setting switches A to C and G to I that contains the two setting switches B, C presently selected.

Herewith, only by selecting and determining the two setting switches B, C to operate, the controller 30 changes the scale size of the display screen image 34 in which the setting switches D to X have been densely displayed and then displays, on the monitor 6, the display screen image 35 where the setting switches A to C and G to I are displayed with lower density so that only one setting switch B overlaps the selected region ER2. Consequently, in the display screen image 34, the user can easily select only one setting switch B via the input panel 11 without fail.

Figure 6:
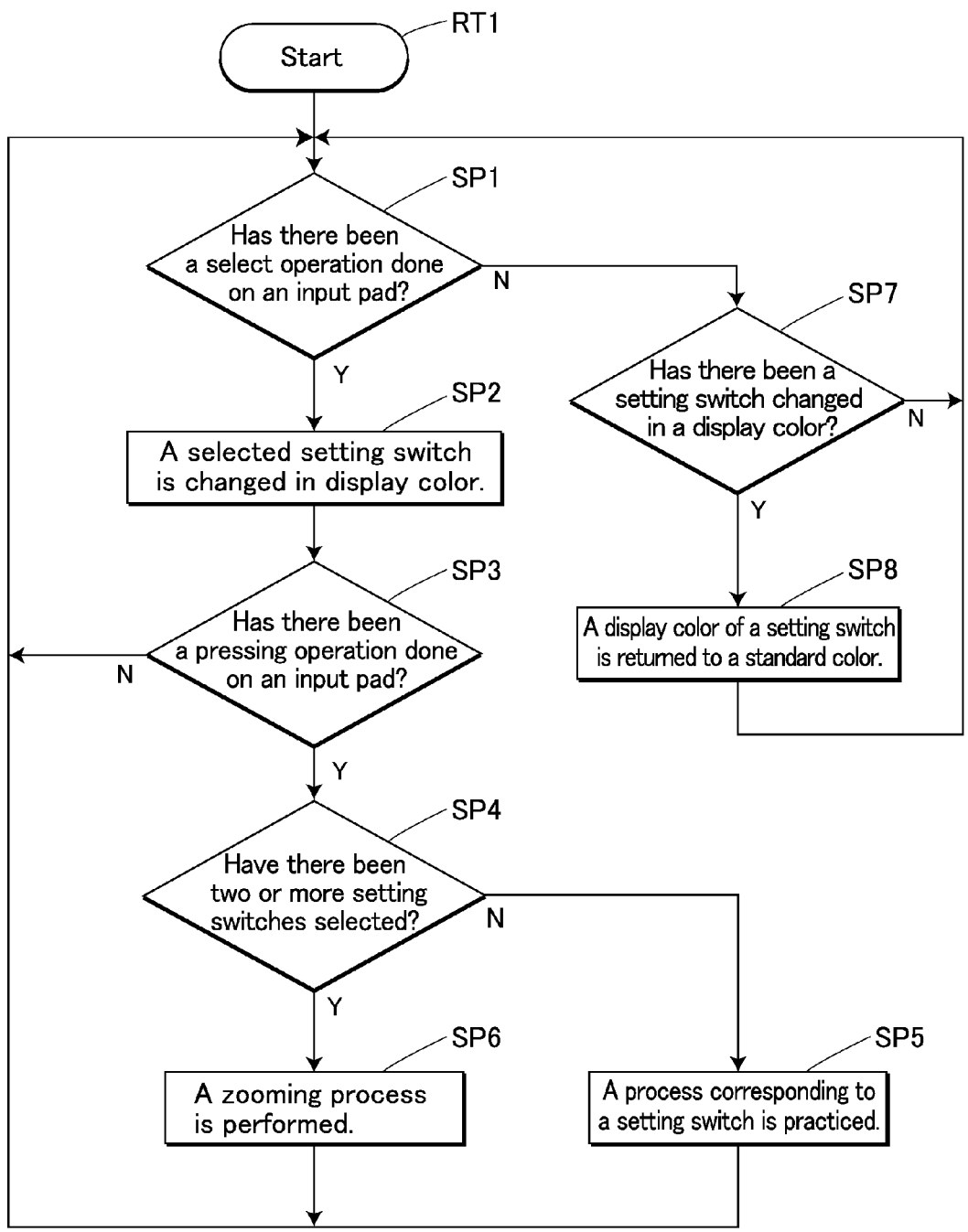
FIG. 6 is a flow chart showing a remote touch pad operation processing procedure.

Next is a description of a remote touch pad operation processing in the navigation system 1 with reference to the flow chart in FIG. 6.

When powering on an electric source 2, the navigation system 2 displays a plurality of the setting switches SW1, SW2 and SW3 on the monitor 6 with the setting switches overlapping the map image to begin with a routine RT1, the initiation step, and then transfer to the step SP1. In the step SP1, the controller 30 of the navigation body 2 judges whether the selective operation has been performed in which the user's finger F contacts with and slides on the input panel 11 or not.

When the judgment result is positive in the step SP1, it is indicated that the selective operation has been carried out on the input panel 11, i.e., the XY coordinate detection operating unit 12 has detected a position in contact with the user's finger F on the input panel 11 as the XY coordinate detecting data D1. Then, behavior of the controller 30 proceeds on to the next step SP2.

In the step SP2, the controller 30 specifies the selected region ER2 on the monitor 6 on the basis of the XY coordinate data D1 received from the XY coordinate detection operating unit 13 to change, into red color, the standard color, black, of the display color of the setting switch SW1 overlapping the selected region ER2, then proceeding on to the step SP3.

In the step SP3, the controller 30 judges whether the finger F has pressed the input panel 11 with the pressing strength lager than a predetermined one or not.

When the judgment result is negative in the step SP3, it is indicated that the user has not yet pressed the input panel 11, so that the behavior of the controller 30 returns the step SP1 again to repeat the processes described above.

On the contrary, when the judgment result is positive in the step SP3, it is indicated that the user has pressed the input panel 11, i.e., the Z coordinate detection data D2 has been detected, by the Z coordinate detection operating unit 13, on a position on the input panel 11 with which the user's finger F is in contact, so that the behavior of the controller 30 proceeds to the next step SP4.

In the step SP4, the controller 30 judges whether two or more setting switches overlap the selected region ER2 and the two or more setting switches SW1, SW2 and SW3 are selected simultaneously or not.

When the judgment result is negative in the step SP4, it is indicated that, e.g., only the setting switch SW1 has been selected and determined to operate from among the setting switches SW1, SW2 and SW3, so that the behavior of the controller 30 proceeds on to the next step SP5.

In the step SP5, the controller 30 displays, on the monitor 6, a predetermined subordinate set image plane (not shown) corresponding to the setting switch SW1 determined, repeating again the above-mentioned processes following the step SP1.

On the contrary, when the judgment result is positive in the step SP 4, it is indicated that among the setting switches A to X, two setting switches B, C, e.g., have been simultaneously selected and determined to operate in the display screen image 34 where the setting switches A to X each of whose display region is small, as shown in FIG. 5, are closely-spaced, so that the behavior of the controller 30 proceeds on to the next step SP6.

In the display screen image 34 where the setting switches A to X each of whose display region is small, as shown in FIG. 5, the selected region ER2 specified by the touch input on the input panel 11 and the two setting switches B, C might overlap each other and therefore the user cannot help select even the switch C unwanted by the user.

Consequently, in the step SP6, the controller 30 changes a scale size of the display screen image 34 displayed on the monitor 6 through performing the zooming process. As a result, the display screen image 35 that contains the two setting switches B, C selected and has been created by zooming the predetermined region ER3 is displayed on the monitor 6, so that the behavior of the controller 30 repeats again the processes following the step SP1.

Thus, the controller 30 makes it possible to easily select only one setting switch B desired by the user by changing the scale size of the display screen image so that only one setting switch B overlaps the selected region ER2.

Going back to the step SP1, when the judgment result is negative, it is indicated that the user has not yet performed the selective operation on the input panel 11, so that the behavior of the controller 30 make the transition to the next step SP7.

In the step SP7, the controller 30 judges whether any of the display colors of the setting switches SW1, SW2 and SW3 have changed from black, as the standard color, to red. When the judgment result is negative, it is indicated that all the setting switches SW1, SW2 and SW3 display the standard color, so that the behavior of the controller 30 goes back again to the step SP1 to wait for the next selective operation on the input panel 11.

At the same time, when the judgment result is positive in the step SP7, it is indicated that any display color of the setting switches SW1, SW2 and SW3 has changed into red since the user has performed the selective operation on the input panel 11, so that the behavior of the controller 30 makes the transition to the next step SP8.

In the step SP8, the controller 30 gets the color of the setting switch SW1 that had been changed into red, back to black as the standard color, to return again to the step SP1, waiting for the next selective operation on the monitor 6 11 by the user.

In the system described above, a remote touch pad 4 is made up separately from a navigation body 2 and is equipped with a select function for selecting any of setting switches SW1, SW2 and SW3 that are displayed on a monitor 6.

Accordingly, the remote touch pad 4 enables the remote control of the navigation body 2 by performing the selective operation on an input panel 11, thus being able to provide to a user the same operational feeling as if touching a touch panel via the input panel 11 without touching directly the monitor 6 with a finger.

Further, the remote touch pad 4 detects pressing strength in a Z direction by means of a Z coordinate detection operating unit 13 as well as detecting a two-dimensional plane coordinate comprising an X2 coordinate and a Y2 coordinate.

The remote touch pad 4 delivers Z coordinate data D2 detected by the Z coordinate detection operating unit 13 to the navigation body 2 and determines selection of the setting switch SW1 presently selected on the monitor 6 to render the navigation body 2 practice a prescribed process corresponding to the setting switch SW1.

When thus using the remote touch pad 4, the user can select easily the setting switches SW1, SW2 or SW3 the user desires with only one finger F of one hand without taking the finger off the input panel 11 and further the setting switches SW1, SW2 or SW3 that has been selected is determined to operate, so that the prescribed process corresponding to the setting switch selected can be easily practiced.

Furthermore, when a plurality of the setting switches B, C has been selected and determined to operate simultaneously by the XY coordinate detection operating unit 12, a predetermined region ER3 containing the plurality of the setting switches B, C is zoomed selectively from among the display screen image 34 being presently displayed on the monitor 6. Then, on the monitor 6, the display screen image 35 is displayed in which the setting switches B, C selected are highlighted.

In other words, when the plurality of the setting switches B, C have been simultaneously selected by the XY coordinate detection operating unit 12, the plurality of the setting switches B, C selected are zoomed in an arbitrary size on the monitor 6.

Consequently, even if the setting switches B, C are closely-spaced and therefore only one setting switch B desired is hard to be selected by a touch input from the input panel 11, by zooming the predetermined region ER3 containing the two setting switches B, C selected, a space between the setting switches B, C can be widened, thus allowing only the desired setting switch B to be easily selected by the touch input of the input panel 11.

Additionally, the controller 30 changes display color of the setting switch SW1 selected from black, the standard color, to red, comparatively outstanding color, to thereby display the setting switch SW1, while keeping black, the standard color, unchanged for the display color of the setting switches SW2, SW3 that are adjacent to the setting switch SW1 selected and have been not selected.

Namely, the controller 30 recognizes an arbitrary setting switch SW1 selected corresponding to the touch input of the remote touch panel 4 from among the plurality of the setting switches SW1, SW2 and SW3 that are displayed in a standard status. Then, the controller 30 changes a displayed status of only the setting switch SW1 that has been recognized, while keeping the setting switches, unrecognized and therefore unselected and further displayed in the standard status, unchanged.

As a result, the navigation system 1 lets the user keeping a close watch on the setting switch SW1 selected recognize the setting switch SW1 at one view without transferring a user's gaze to the setting switches SW2, SW3, adjacent to the setting switch SW1, that have been not selected. Accordingly the navigation system 1 can let the user learn easily and instantly to which position on the monitor 6 a position of the user's finger on the input panel 11 corresponds.

As described above, according to the present embodiment, the remote touch pad 4 capable of performing the selective operation is provided separately from the navigation body 2 and by performing the touch input by the input panel 11, the navigation body 2 can be remote-controlled. Hence, the same operation feeling as if touching the touch panel 5 can be offered without touching directly the monitor 6 with a finger by the user, thus allowing the finger dirt to be prevented from adhering to the monitor 6 and besides enabling the operation excellent in usability.

Further, according to the present embodiment, the XY coordinate detection operating unit 12 with the select function for selecting the setting switches SW1, SW2 and SW3 is included and besides the Z coordinate detection operating unit 13 with the determination function for determining the setting switch SW1 selected to operate is also included. Hence, the prescribed process corresponding to the setting switch SW1 can be easily practiced, thus being able to improve maneuverability markedly.

Furthermore, according to the present embodiment, even if two setting switches B, C have been simultaneously selected by the touch input of the input panel 11 due to the density of the setting switches A to X, the scale size of the display screen image 34 can be changed to highlight the two setting switches B, C selected. Hence, only the desired setting switch B can be readily selected via the input panel 11.

In the embodiment described above, an example has been proposed that is applicable to the navigation system from among the remote-control electronic apparatus. The present invention, however, is not limited to the example and may be applied to various types of remote-controlled electronic apparatuses including an in-vehicle air-conditioning system arranged in a console panel inside a vehicle and an in-vehicle audio system or the like.

Moreover, in the embodiment described above, employed are the setting switches SW1, SW2 and SW3 for performing basic behavior of the navigation system 1 and the setting switches A to X that are alphabetical switches "A" to "X" used for inputting the alphabet letters. The present invention, however, is not limited to these switches and instead various sorts of switch images displayed on the monitor 6 may be utilized for practicing various performances of the navigation system 1.

Further, in the embodiment described above, when two setting switches B, C have been simultaneously selected and have been determined to operate, the zooming process is performed. The present invention, however, is not limited to this performance. When the prescribed number of the setting switches A to X such as three and four switches, that is two or more switches have been simultaneously selected and have been determined to operate, the zooming process may be implemented.

Furthermore, in the embodiment described above, the predetermined region ER3 containing the two setting switches B, C selected is zoomed and the display screen image 35 is displayed on the monitor 6. The present invention, however, is not limited to these processes and only the two setting switches B, C selected may be zoomed on the monitor 6 to be displayed on the monitor 6. In essence, a plurality of the setting switches B, C selected may be zoomed in an arbitrary size on the monitor 6.

Moreover, the present invention is not limited to the embodiment described above and various modifications are possible within the scope of gist of the invention.

What is claimed is:

1. A remote-control switch electrically coupled to a display unit for displaying an image controlled by a control means on a monitor with a touch-sensitive panel, said touch-sensitive panel allowing a user to touch switch images thereon with a user's finger to operate said touch-sensitive panel comprising:

an input panel arranged with a plurality of switches on its plane, said input panel, which is made up separately from said display unit, is mounted on a car-interior front console, including an XY coordinate detection operating unit and a Z coordinate detection operating unit, said XY coordinate detection operating unit detecting a position, on said input panel, on which a selective operation has been performed by using two-dimensional plane coordinate when the selective operation has been performed by making a finger contact with and slide on said input panel, while said Z coordinate detection operating unit detecting the pressing strength applied on said two-dimensional plane coordinate and then determining the selective operation when pressing strength larger than predetermined strength is applied from an upper side to said input panel, wherein an image plane coordinate of said display unit and each switch coordinate of said input panel substantially correspond to each other, and said switch image corresponding to said each switch is displayed on said display unit by means of said control means, and then when the selective operation has been performed, a central position of a contact region in contact with said user's finger is detected, and based on this detection result, a selected region which corresponds to said contact region and is not displayed is determined on the image plane of said display unit;

when only one switch image overlaps said selected region at the time of the selective operation, said only one switch image which has overlapped said selected region is allowed to change in display from a standard color to another color to be permitted to stand out from other switch images not overlapping said selected region so that it is displayed on said image plane that said one switch has been selected via said input panel, even when a plurality of said switch images overlap said selected region at the time of the selective operation, all of the plurality of said switch images that simultaneously overlap said selected region are allowed to change simultaneously in display from a standard color to another color to be permitted to stand out from other switch images so that it is displayed on said image plane that the plurality of said switch images have been selected simultaneously via said input panel, the color change of said switch images displayed on said display unit allows the user to recognize a position of said user's finger on said input panel at the time of the selective operation performed by the user sliding his or her finger on said input panel prior to determining said switch images displayed on said display unit, and when said Z coordinate detection operating unit detects the pressing strength applied on said two-dimensional plane coordinate with a plurality of said switch images overlapping said selected region and all of the plurality of said switch images being changed from said standard color to another color, a space between the plurality of said switch images whose color has changed from said standard color to another color is widened, and the plurality of said switch images whose space is widened are displayed on said display unit, thus allowing only one of said switch images to be overlapped in said selected region.

2. A remote-control switch according to claim 1, wherein said input panel comprises two layers, an upper layer and a lower layer, a select function of said switch image is included in an upper layer, and a determination function for determining said select function to operate is included in a lower layer.

3. A remote-control switch according to claim 1, wherein when a plurality of said switch images on a display screen in said display unit have been selected by said input panel, the plurality of said switch images thus selected are highlighted.

4. A remote-control switch according to claim 1, wherein when plurality of said switches are simultaneously selected, the plurality of said switches thus selected are zoomed in an arbitrary size on said display unit.

5. A remote-control switch according to claim 1, wherein said input panel has the same aspect ratio as that of a display screen of said display unit and is made smaller than the display screen.

6. A remote-control switch according to claim 1, wherein said display unit is used for an in-vehicle navigation system.

7. A remote-control switch according to claim 2, wherein said display unit is used for an in-vehicle navigation system.

8. A remote-control switch according to claim 3, wherein said display unit is used for an in-vehicle navigation system.

9. A remote-control switch according to claim 4, wherein said display unit is used for an in-vehicle navigation system.

10. A remote-control switch according to claim 5, wherein said display unit is used for an in-vehicle navigation system.

11. A remote-control switch as set forth in claim 1, wherein said input panel having two layers, an upper layer and a lower layer, said lower layer arranged on the underside of said upper layer via a film layer having powders, wherein a pressing force applied to the input panel by a user's finger is transmitted via the powders so that the pressing force is concentrated to the powders without being dispersed over the film layer.

* * * * *